United States Patent [19]

van Dulmen

[11] Patent Number: 4,721,375
[45] Date of Patent: Jan. 26, 1988

[54] VIEWING APPARATUS WITH ADJUSTABLE ALIGNMENT MARKER SUPPORT

[75] Inventor: Hendrikus A. M. van Dulmen, Eindhoven, Netherlands

[73] Assignee: U.S. Philips Corporation, New York, N.Y.

[21] Appl. No.: 903,045

[22] Filed: Sep. 2, 1986

[30] Foreign Application Priority Data

Sep. 11, 1985 [NL] Netherlands .......................... 8502480

[51] Int. Cl.⁴ ..................... G02B 23/00; G02B 23/16; H01J 31/49
[52] U.S. Cl. .................................... 350/538; 250/333; 350/566; 350/567
[58] Field of Search ............... 350/501, 538, 566, 567; 250/333, 467.1

[56] References Cited

U.S. PATENT DOCUMENTS 4,417,814 11/1983 Doliber .............................. 250/333

Primary Examiner—Bruce Y. Arnold
Assistant Examiner—Vincent J. Lemmo
Attorney, Agent, or Firm—F. Brice Faller

[57] ABSTRACT

A viewing apparatus suitable for use as a night sight includes an image intensifier (3) arranged between an objective (1) and an ocular (7). An alignment member (25) has an alignment marker (28) arranged between the image intensifier (3) and the ocular (7) adjustable by rotation of an alignment marker support (23) about two orthogonal axes (X, Y) which intersect each other at a virtual point of rotation (M) which is located on an optical axis (17).

4 Claims, 4 Drawing Figures

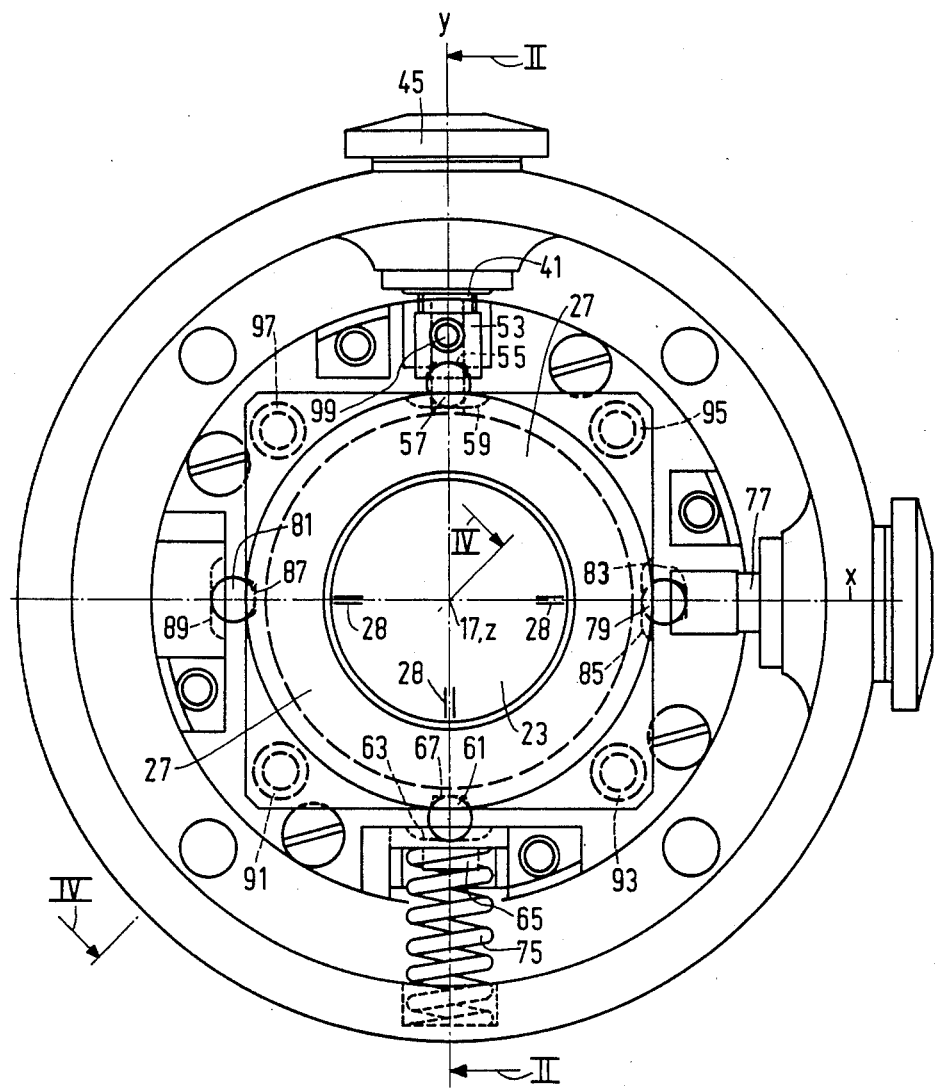
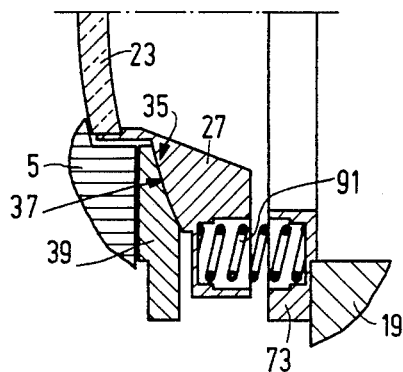
FIG.3
FIG.4

VIEWING APPARATUS WITH ADJUSTABLE ALIGNMENT MARKER SUPPORT

BACKGROUND OF THE INVENTION

The invention relates to a viewing apparatus having an image intensifier which is arranged between an objective and an ocular. An output screen faces the ocular, and an alignment member with an alignment marker support displaceable in two orthogonal directions with respect to the output screen is arranged between the output screen and the ocular.

In a known viewing apparatus of the kind mentioned in the opening paragraph (known from European Patent Application No. 0 133 729), the output screen of the image intensifier consists of a flat fibre optics plate provided with a phosphor layer. Flat spacer elements separate the phosphor layer from the alignment marker support in the alignment member. Imperfections in the optical system of the image intensifier lead to a curved image, which can be compensated for by means of comparatively expensive electron-optical means.

SUMMARY OF THE INVENTION

For adjustment of the alignment member no translatory movements, but only rotations are used, so that the curved image of the image intensifier can be compensated for in a comparatively simple manner and the alignment marker can be simply adjusted by means of a curved output screen of the image intensifier.

For this purpose, the alignment marker support has an input screen having a first spherical contour substantially corresponding to a second spherical contour of the output screen arranged opposite thereto. The alignment marker support is rotatable about a first and a second axis of rotation, which are at right angles to each other and intersect each other in a virtual point of rotation which is located on an optical axis of the viewing apparatus. The centers of curvature of the first and the second spherical contour substantially coincide with the virtual point of rotation of the alignment marker support.

In a preferred embodiment of the viewing apparatus, which is resistant to shocks and vibrations as well as to dust particles and other particles between output screen and input screen, a holder connected to the alignment marker support has a third spherical contour which engages and is guided along a fourth spherical contour of a copying member fixedly arranged in the alignment member. The first, second, third and fourth spherical contours have the same center of curvature which coincides with the virtual point of rotation of the alignment marker support, while the first and second spherical contours have different radii of curvature.

In a further embodiment of the viewing apparatus, the rotation about the first and second axes of rotation is effected in a simple manner by identical means. The holder is rotatable by means of a first translation member about the first axis of rotation and by means of a second translation member about the second axis of rotation, the first and second translation members being identical and each having an adjustable pin, which is coupled by means of a driving ball to the holder. The pins are displaceable along two orthogonal lines intersecting each other at a point located on the optical axis of the viewing apparatus and which coincide with the longitudinal axis of the relevant pin.

To prevent rotation about one axis of rotation during rotation about the other axis of rotation, the holder is resiliently arranged in the alignment member by means of two return springs acting in orthogonal directions, while a guide ball is arranged diametrically opposite to each of the two driving balls. The driving ball and guide ball form a pair engaging in elongate slots in the holder, which extend so that their longitudinal directions are at right angles to each other.

BRIEF DESCRIPTION OF THE DRAWING

FIG. 3 is an elevation of the alignment member shown in FIG. 2, FIG. 4 is a sectional view taken on the line IV—IV in FIG. 3.

DETAILED DESCRIPTION OF THE PREFERRED EMBODIMENT

Figure 1:
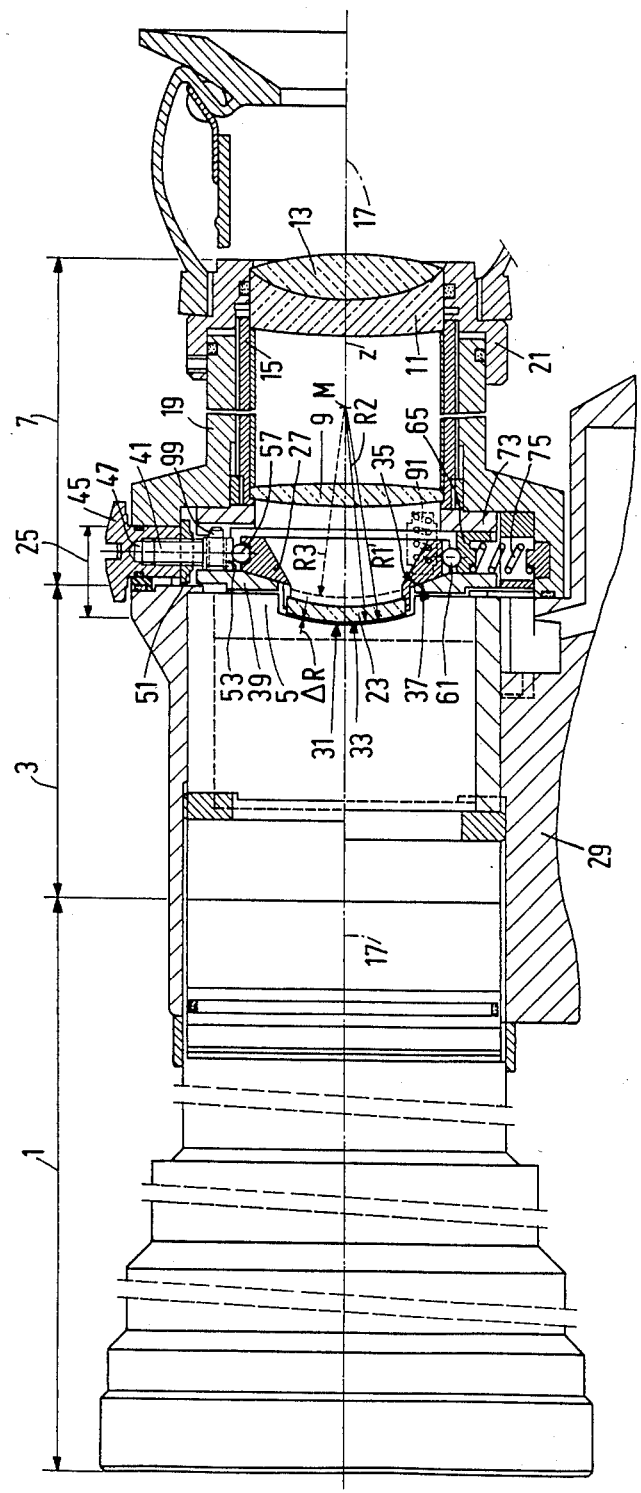
FIG. 1 shows a longitudinal sectional view of the viewing apparatus.

The viewing apparatus shown in FIG. 1 has a telescopic objective 1 of a usual kind and an image intensifier 3 optically coupled thereto. The image intensifier 3 is also of a kind known per se from British Patent Application No. 2090012 having a curved concave output screen 5. An ocular 7 is coupled optically and mechanically to the image intensifier 3. The ocular 7 comprises a lens system having lenses 9, 11 and 13 secured in a lens fitting 15. The objective 1, the image intensifier 3 and the ocular 7 are aligned along an optical axis 17. The lens fitting 15 is slidably guided in a housing 19 of the ocular 7. An adjustment ring 21 serves to displace the lens fitting 15 along the optical axis 17. By means of the displacement of the lens fitting 15, the eye of the operator can be focused on a point to be described below on the optical axis 17 between the output screen 5 of the image intensifier 3 and an input screen 23 of an alignment member 25 arranged between the image intensifier 3 and the ocular 7. The input screen 23 is secured in a holder 27. An alignment marker 28 (graticule) is present on the input screen 23 (cf. FIG. 3). The input screen 23 therefore acts as an alignment marker support. In general, the situation is such that due to tolerances in the manufacture of the viewing apparatus and/or a supporting member 29, by which the viewing apparatus can be secured, for example on a weapon, the optical axis 17 does not coincide with the axis along which the viewing apparatus has to be aligned. Therefore, the alignment marker has to be adjustable by means of an alignment member with respect to the optical axis 17. The alignment marker is generally adjusted on a so-called calibration device with respect to a standard target. After this preadjustment a final adjustment takes place, which is adapted to the eye of the operator. After these two adjustments, the alignment marker is generally no longer located on the optical axis 17.

The output screen 5 of the image intensifier 3 has a spherical first contour 31 having a radius $R_1$, while the input screen 23 has a spherical second contour 33 having a radius $R_2$. The contour 33 is located at a distance $\Delta R = R_1 - R_2$ from the contour 31. In the holder 27 a spherical third contour 35 is formed, which engages and is guided along a spherical fourth contour 37 located on a ring 39, which is fixedly arranged in the alignment member 25 and acts as a copying member. The radius of the third and fourth spherical contours is equal to $R_3$. The centers of curvature on the first, second, third and fourth contours coincide at a point M on the optical axis 17. The point M forms at the same time the virtual point of rotation of the alignment marker support 23 and the holder 27, respectively.

The alignment marker support 23 is rotatable about a first axis of rotation X through the virtual point of rotation M by means of a first translation member in the form of a threaded pin 41, which is displaced in the direction of its longitudinal axis 43 by means of a rotary knob 45. The rotary knob 45 is provided with a threaded bore 47. Since the rotary knob 45 is locked against translation in a bore 49 of the housing 19 by means of a nut 51, the pin 41 performs a translation upon rotation of the knob 45. At its lower end, the pin 41 is provided with a pushing block 53 which is provided with an elongate slot 55. A driving ball 57 is journalled in the slot 55. The driving ball 57 is journalled at the same time in an elongate slot 59 in the holder 27. The slots 55 and 59 have a trapezoidal cross-section in a direction tranverse to their longitudinal direction and extend so that their longitudinal directions are at right angles to each other. There is arranged diametrically opposite to the driving ball 57 a guide ball 61, which is journalled at one end in an elongate slot 63 in a sliding block 65 and at its other end in an elongate slot 67 in the holder 27. The slots 63 and 67 also have a trapezoidal cross-section, while their longitudinal directions are at right angles to each other. The longitudinal directions of the slots 55 and 67 and of the slots 59 and 63, respectively, are parallel to each other. The sliding block 65 is guided along a sliding surface 69 of the holder 27 and a sliding surface 71 of the supporting ring 73 engaging the housing 19. A compression spring 75 acting upon the sliding block 65 in the Y direction ensures a journalling free of clearance in the Y direction of the holder 27.

Figure 2:
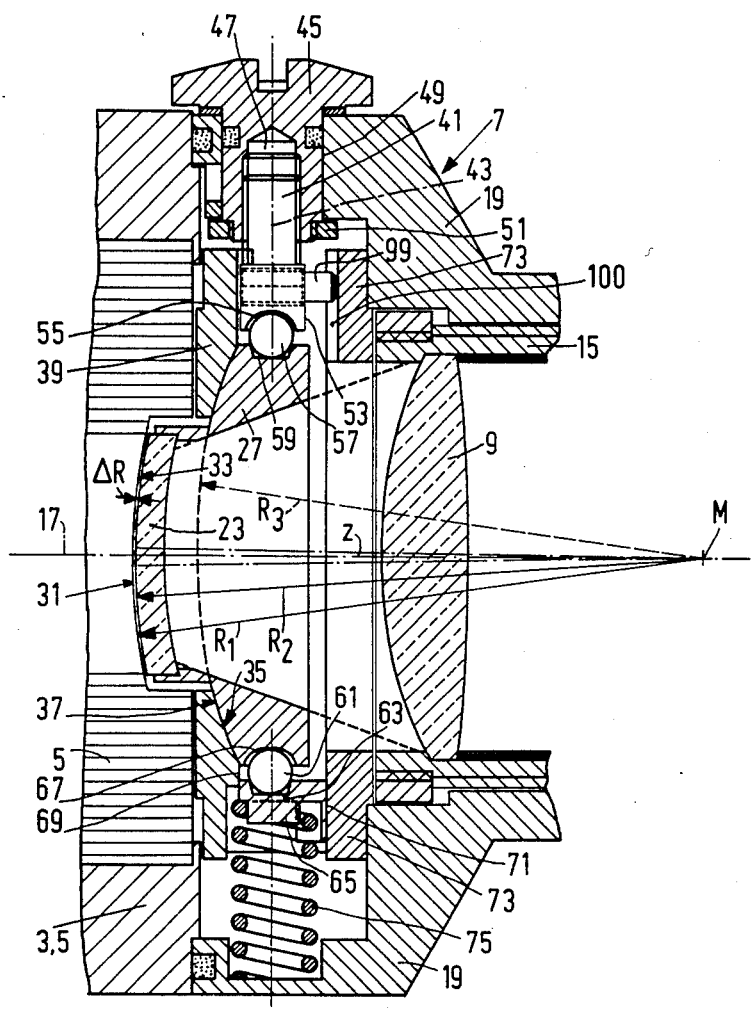
FIG. 2 shows on an enlarged scale a longitudinal sectional view of the alignment member of the viewing apparatus shown in FIG. 1 taken on the line II—II in FIG. 3.

The input screen or alignment marker support 23 is further rotatable about a second axis of rotation Y through the virtual point of rotation M by means of a second translation member in the form of a threaded pin 77 (cf. FIG. 3), which is actuated in the same manner as the pin 41. The journalling in the X direction of the holder 27 is quite identical to that in the Y direction. A driving ball 79 and a guide ball 81 arranged diametrically opposite thereto are used for this purpose. The driving ball 79 is journalled in elongate slots 83 and 85, while the guide ball 81 is journalled in elongate slots 87 and 89. Upon rotation of the holder 27 about the X axis, the slots 85 and 89 prevent a simultaneous rotation about the Y axis, while upon rotation about the Y axis the slots 59 and 63 prevent a simultaneous rotation about the X axis. The balls 57 and 61 as well as the balls 79 and 81 form pairs associated with the X and the Y direction, respectively. In the Z direction, the holder 27 is pressed without clearance against the ring 39 by means of four compression springs 91, 93, 95 and 97 (cf. FIG. 3). The compression springs 91, 93, 95 and 97 are arranged in a manner shown in FIG. 4 for the compression spring 91. The pin 41 is locked against rotation in the adjusted position by means of a threaded pin 99, which is screwed into a bore of the pushing block 53, and is disposed in a groove 100 (cf. FIG. 2) of the ring 73.

As already stated, the holder 27 and hence the alignment marker 28 are preadjusted on a calibration device and are subjected to a final adjustment adapted to the eye of the operator with the use of the viewing apparatus in the open field. The lens system of the ocular 7 is moreover displaceable by means of the adjustment ring 21 (cf. FIG. 1) over such a distance with respect to the output screen 5 of the image intensifier 3 that eye deviations of $-3$ to $+5$ dioptries can be compensated for. The operator's eye is preferably focused on a point on the optical axis 17 halfway between the output screen 5 and the input screen 23 or in other words: halfway between the first contour 31 and the second contour 33. In this case, it is ensured that both the output image of the image intensifier 3 and the alignment marker 28 lie within the depth of field of the ocular 7. It should be noted that with a sufficiently large depth of field it is sufficient when the centres of curvature of the first, second, third and fourth contours substantially coincide at the point M. The admissible deviation is determined by the available range of the depth of field of the ocular used and can be defined in a simple manner by those skilled in the art. Attempts will preferably be made to locate the centres of curvature exactly at the point M. However, this also depends upon manufacturing tolerances. It should further be stated that the admissible value of $\Delta R$ depends both upon manufacturing tolerances and upon requirements with respect to wear which are imposed on the surfaces of the first contour 31 and the second contour 33. In the ideal case, $\Delta R$ could be equal to zero. The risk of damage of the optical contours 31 and 33 by particles of dust and/or of wear is then present, however. Moreover, the viewing apparatus may be subjected to shocks or vibrations, especially if the viewing apparatus is mounted on a weapon. A direct contact between the surfaces of the contours 31 and 33 could lead to damage with $\Delta R=0$. In the present case, a value of $\Delta R$ is therefore chosen which is equal to at most 0.1 mm. Associated values of $R_1$ and $R_2$ can then be:

$R_1 = 40$ mm, $R_2 = 39.9$ mm.

A practical value for $R_3$ is 36 mm.

By the use of a copying member (ring 39), in which event upon adjustment of the alignment marker 28 $\Delta R$ remains constant during this adjustment, it is ensured that the alignment marker is always located within the range of depth of field of the ocular 7. Moreover, a virtual point of rotation M is obtained which lies within the ocular 7, but which does not require a construction in situ so that the ocular can be arranged at a comparatively short distance from the output screen 3. Thus, a compact viewing apparatus is obtained.

What is claimed is:

1. A viewing apparatus comprising an image intensifier which is arranged between an objective and an ocular and is provided with an output screen facing the ocular, an alignment member having an alignment marker support displaceable in two orthogonal directions with respect to the output screen being arranged between the output screen and the ocular, characterized in that the alignment marker support comprises an input screen having a first spherical contour substantially corresponding to a second spherical contour of the output screen arranged opposite thereto, which alignment marker support is rotatable about a first and a second axis of rotation which are at right angles to each other and intersect each other at a virtual point of rotation located on an optical axis of the viewing apparatus, the centers of curvature of the first and second spherical contour substantially coinciding with the virtual point of rotation of the alignment marker support.

2. A viewing apparatus as claimed in claim 1, characterized in that a holder connected to the alignment marker support has a third spherical contour which engages and is guided along a fourth spherical contour of a copying member fixedly arranged in the alignment member, the first, second, third and fourth spherical contours having the same center of curvature, which coincides with the virtual point of rotation of the alignment marker support, while the first and second spherical contours have different radii of curvature.

3. A viewing apparatus as claimed in claim 2, characterized in that the holder is rotatable by means of a first translation member about the first axis of rotation and by means of a second translation member about the second axis of rotation, the first and second translation members being identical and each having an adjustable pin which is coupled by means of a driving ball to the holder, these pins being displaceable along two orthogonal lines which intersect each other at a point located on the optical axis of the viewing apparatus and which coincide with the longitudinal axis of the relevant pin.

4. A viewing apparatus as claimed in claim 3, characterized in that the holder is resiliently arranged in the alignment member by means of two return springs acting in orthogonal directions, while a guide ball is arranged diametrically opposite to each of the two driving balls, the driving ball and the guide ball forming a pair engaging in elongate slots in the holder and which extend so that their longitudinal directions are at right angles to each other.

* * * * *